Oct. 19, 1954     H. D. SMITH     2,691,844
GUN TRAP FOR KILLING BIRDS OF PREY
Filed March 13, 1950
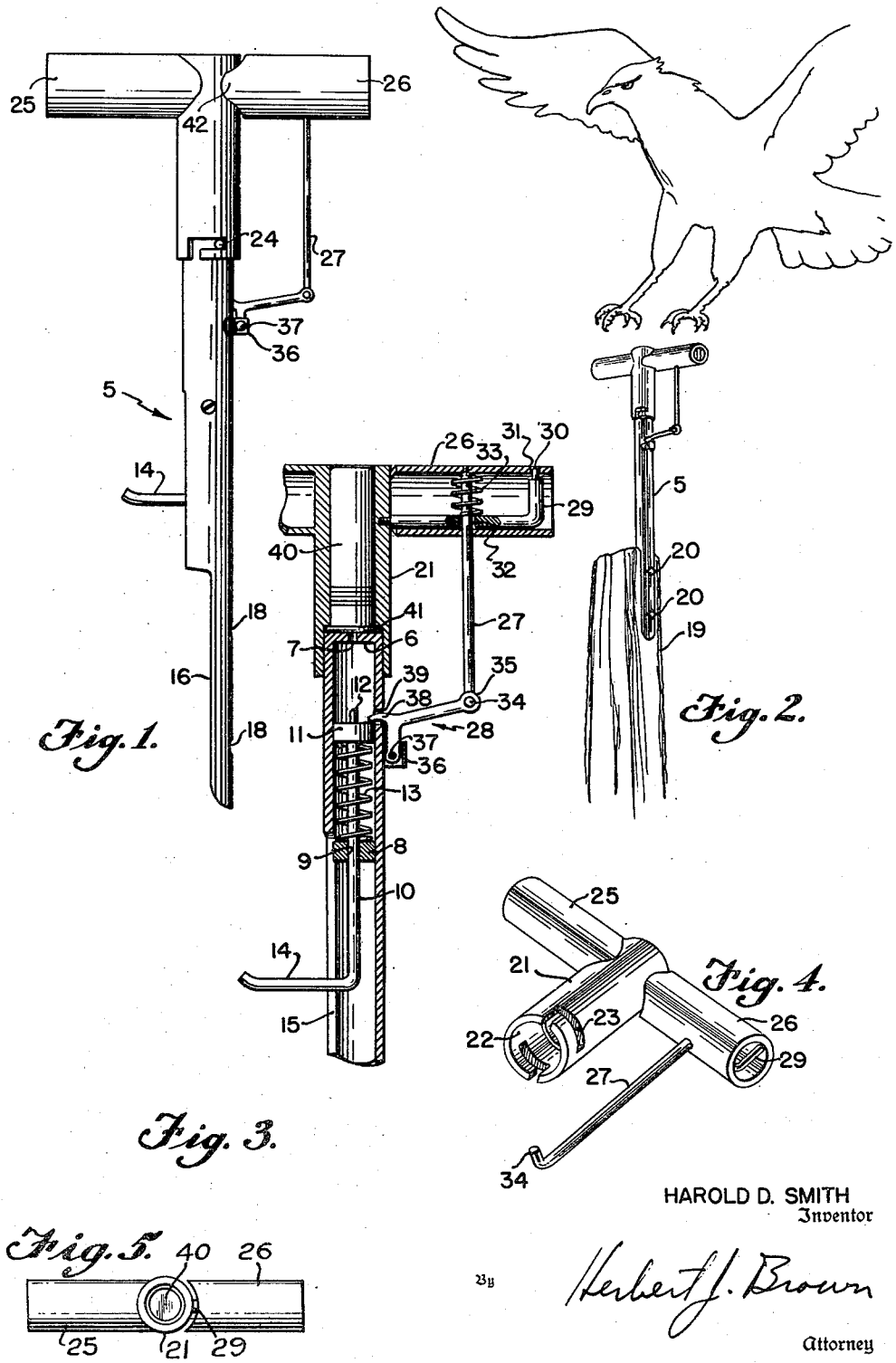
HAROLD D. SMITH
Inventor
Herbert J. Brown
Attorney

Patented Oct. 19, 1954

2,691,844

UNITED STATES PATENT OFFICE

2,691,844

GUN TRAP FOR KILLING BIRDS OF PREY

Harold D. Smith, Spofford, Tex., assignor of one-half to L. P. Hudson, Fort Worth, Tex.

Application March 13, 1950, Serial No. 149,395

4 Claims. (Cl. 43—84)

This invention relates to gun traps for killing hawks and other birds of prey.

An object of the invention is to provide a gun trap for the described purpose which will not cripple the bird, but will always kill the bird instantly.

Another object of the invention is to provide a trap of the described class which will not require any bait, but will attract the birds of prey by reason of its shape when located in areas where such birds are likely to be found.

A further object of the invention is to provide a gun type trap which may employ a shotgun shell for effectively killing birds of prey at close range.

The invention will be more readily understood by reference to the accompanying drawings and the following description.

Figure 1 is an elevation of a gun trap embodying the features of the present invention.

Figure 2 is a perspective view of the trap illustrated in Figure 1 mounted on the top of a post, and showing a hawk alighting on the perch of the trap.

Figure 3 is a vertical sectional view similar to Figure 1, and illustrating the relative positions of the operating parts.

Figure 4 is a perspective view of the gun barrel and the perch, and showing the actuating rod connected thereto.

Figure 5 is a plan view of Figure 1.

In the exemplary form of the invention illustrated in the accompanying drawings, the numeral 5 generally designates a vertical tubular support having a closed upper end 6 except at the center thereof where there is a central opening 7. Within the vertical tubular support 5 there is a fixed guide 8 having a central opening 9 for slidably receiving a firing bolt 10 therethrough. The upper end of the firing bolt 10 is provided with a cylindrical hammer 11 which is slidably movable within the upper end of the tubular support 5. A firing pin 12 projects upwardly from the center of the hammer 11, and a compression spring 13 is mounted around the firing rod 10 between the said hammer and the guide 8. The lower end of the firing rod 10 is bent outwardly so as to provide a cocking lever 14, and the side of the support 5 is provided with a vertical slot 15 to accommodate said lever. The lower end of the support 5 is cut away to form a downwardly projecting side 16 having holes 18 therein whereby the same may be vertically mounted on the top of a post 19 by means of screws or nails 20.

The gun barrel 21 is recessed in its lower end, as at 22, to receive the upper end of the tubular support 5. The opposing sides of the lower end of the barrel 21 are provided with bayonet slots 23 which engage pins 24 projecting from the surface of the tubular support 5. The upper end of the barrel 21 is provided with a stationary laterally projecting member 25 and a vertically movable tubular member 26 opposite the first referred to member. The tubular members 25 and 26 provide a perch upon which a hawk or other bird of prey will alight, and said members are relatively short whereby a bird alighting on the same will place a foot on each, and thereby position its body over the muzzle of the gun barrel 21. The movable member 26 may be mounted in different ways, be it sufficient that the weight of the bird alighting thereon will move the actuating rod 27 attached thereto downwardly and actuate the trigger 28 which is arranged to release the hammer 11, in the manner to be described. As shown in Figure 3, there is an L shaped support 29 threadedly engaged at one end in the side of the barrel 21 and located within the tubular member 26 and having its outer end upwardly directed where it is provided with a projection 30 of reduced diameter which loosely fits an opening 31 in the upper side and outer end of the movable member 26. The actuating rod 27 is positioned upwardly through the lower side of the movable member 26, and after passing through a relatively large opening 32 in the support 29, its upper end is threadedly engaged or otherwise secured in the upper side of said movable member. A relatively light compression spring 33 is positioned around the upper end of the actuating rod 27 and between the upper inner wall of the movable member 26 and the upper surface of the L shaped support 29. The lower end of the actuating rod 27 is provided with a lateral projection 34 which slidably fits into and hingedly engages an eye 35 in the outer end of the trigger 28. As shown in detail in Figure 3, the trigger 28 is substantially L shaped and the end thereof opposite the eye 35 is pivotally mounted in a bracket 36 on the side of the support 5 by means of a pin 37. The angle of the L shaped trigger 28 is provided with an integral sear 38 which is directed through an opening 39 in the side of the tubular support 5. A shotgun shell or cartridge 40 is received within the length of the barrel 21, and the rim 41 of the shell is received within the barrel recess 22 and supported on the upper end of the tubular support 5.

The shell 40 may be conveniently loaded in the gun barrel 21 by rotating the latter and by disengaging the bayonet slots 23 from the pins 24. It will be noted that the projection 34 on the lower end of the actuating rod 27 is directed so as to engage and disengage the trigger eye 35 when the barrel 21 is rotated. The trap may be easily cocked by pressing downwardly on the movable perch member 26 and by pulling downwardly on the cocking lever 14. When the hammer 11 is below the sear 38 the movable perch member 26 is released and the sear engages the upper end of the hammer. Integral inwardly projecting guides 42 are provided on opposite sides of the inner end of the movable perch member 26 so as to generally align the same with the stationary perch member 25, yet not interfere with the vertical movement of said movable member. The compression of the spring 33 within the movable perch member 26 primarily determines the weight required to actuate the trigger 28; however, the compression spring 13 within the tubular support should not be so strong as to cause the sear to hang on the upper surface of the hammer 11.

The assembly is mounted on a post, such as 19, in a chicken yard or other place where the birds are likely to alight prior to catching their prey. For the reasons hereinbefore stated, the birds will alight with one foot on each of said members and thus position their bodies over the muzzle of the barrel. The weight of the bird on the movable member 26 will release the hammer 11 and cause the firing pin to detonate the shell or cartridge 40, and thereby kill the bird. The empty shell can then be removed by rotating the barrel, disengaging the actuating rod projection 34 from the trigger eye 35, and raising the barrel 21 upwardly. A new shell or cartridge 40 is then replaced in the barrel and the trap is again cocked in the manner described.

The described form of the invention is not restrictive, but may be made in many ways within the scope of the appended claims.

What is claimed is:

1. In a gun trap, a vertically mounted tubular support having a vertical slot in one side thereof, an upwardly directed unitary gun barrel adapted to receive a shell or cartridge in the lower end thereof, said barrel being detachably secured at its lower end in clamping engagement to the upper end of said support, a guide having a vertical opening therethrough secured within said tubular support, a firing bolt slidably mounted in said guide, a cocking lever connected with said firing bolt and projecting outwardly through said vertical slot, a cylindrical hammer mounted on the upper end of said firing bolt and slidably engaging the inner wall of said tubular support, firing means on the upper end of said hammer and adapted to detonate said shell or cartridge, a compression spring between said guide and said hammer, a trigger pivotally supported by said tubular support and adapted to engage said hammer, relatively short perch members laterally projecting from opposite sides of the muzzle end of said barrel in substantially longitudinal alignment, one of said perch members being rigidly secured to said barrel and the remaining said perch member being constructed and arranged to move in a generally downward direction and supported through resilient means by support means attached to said barrel, and a rod directly connecting said movable perch member with said trigger for actuating the latter.

2. In a gun trap, a vertically mounted tubular support, an upwardly directed unitary gun barrel having a bayonet slot in the lower end thereof, said barrel being adapted to receive a shell or cartridge in the lower end thereof, the lower end of said barrel being constructed and arranged to receive the upper end of said support, a laterally projecting pin on the side of said support near the upper end thereof and adapted to engage said bayonet slot, said support having a firing mechanism contained therein and arranged to fire said shell or cartridge, said firing mechanism including a trigger projecting outwardly of the support and having an eye formed therein, relatively short perch members laterally projecting from opposite sides of the muzzle end of said barrel, one of said perch members being rigidly secured to said barrel and the remaining said perch member being constructed and arranged to move in a generally downward direction and supported through resilient means by support means attached to said barrel, an actuating rod connected at one end with said movable perch member and the other end of said rod being in the form of a lateral bend detachably secured in said eye whereby said actuating rod may be disengaged from said eye when said barrel is rotated.

3. In a gun trap, a vertically mounted support, an upwardly directed unitary gun barrel adapted to receive a shell or cartridge in the lower end thereof, said barrel being detachably secured at its lower end in clamping engagement to the upper end of said support, said support having a firing mechanism contained therein and arranged to fire said shell or cartridge, said firing mechanism including a trigger projecting outwardly of the support, relatively short perch members laterally projecting from opposite sides of the muzzle end of said barrel in substantially longitudinal alignment, one of said perch members being constructed and arranged to move in a generally downward direction and supported through resilient means by support means attached to said barrel, and actuating means directly connecting said movable perch member with said trigger.

4. In a gun trap, a vertically mounted tubular support having a vertical slot in one side thereof, an upwardly directed unitary gun barrel having a bayonet slot in the lower end thereof and adapted to receive a shell or cartridge in the lower end thereof, the lower end of said barrel being constructed and arranged to receive the upper end of said support, a laterally projecting pin on the side of said support near the upper end thereof and adapted to engage said bayonet slot, a guide having a vertical opening therethrough secured within said tubular support, a firing bolt slidably mounted in said guide, a cocking lever connected with said firing bolt and projecting outwardly through said vertical slot, a cylindrical hammer mounted on the upper end of said firing bolt and slidably engaging the inner wall of said tubular support, firing means on the upper end of said hammer and adapted to detonate said shell or cartridge, a compression spring between said guide and said hammer, an outwardly projecting trigger pivotally supported by said tubular support and adapted to engage said hammer and having an eye formed therein, relatively short perch members laterally projecting from opposite sides of the muzzle end of said barrel, one of said perch members being rigidly secured to said barrel and the remaining said perch member being spaced from said barrel and constructed and arranged to move in a generally downward direction and to be supported through resilient means by support means attached to and projecting laterally from said barrel, and an actuating rod connected at one end with said movable perch member and the other end of said rod being in the form of a lateral bend detachably secured in said eye whereby said actuating rod may be disengaged from said eye when said barrel is rotated.

References Cited in the file of this patent

UNITED STATES PATENTS

| Number | Name | Date |
|---|---|---|
| 237,942 | Woolsey | Feb. 15, 1881 |
| 796,439 | Lovelace | Aug. 8, 1905 |
| 1,233,268 | Gleason | July 10, 1917 |
| 1,734,876 | Pfeifer | Nov. 5, 1929 |
| 2,093,719 | Furukawa | Sept. 21, 1937 |

FOREIGN PATENTS

| Number | Country | Date |
|---|---|---|
| 61,383 | Germany | Apr. 8, 1892 |